United States Patent Office 3,332,851
Patented July 25, 1967

3,332,851
PROCESS OF PURIFYING GLUCOAMYLASE
Julian Corman, Muscatine, Iowa, assignor to Grain Processing Corporation, Muscatine, Iowa, a corporation of Iowa
No Drawing. Filed Sept. 10, 1964, Ser. No. 395,608
6 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of mircrobiological origin are most commonly used in industry in the enzymatic saccharification of liquefied starch to form dextrose-containing syrups. The culture filtrates of *Aspergillus pheonicus, Aspergillus diastaticus, Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interfere with the production of dextrose when the enzyme preparation is employed to hydrolyze starch. Thus, for example, in the culture broth of *Aspergillus niger* three predominant enzyme systems have been identified, namely, alpha-amylase, glucoamylase (amyloglucosidase) and transglucosidase. Alpha-amylase attacks gelatinized starch by a random type of splitting of the starch molecule, thus causing a desirable reduction in the viscosity of the gelatinized starch dispersion. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages.

In contrast to the multi-chain action of alpha-amylase, the action of glucoamylase is thought to be a "single-chain" action where an enzyme molecule attaches to the dextrin and detaches one glucose unit at a time from the dextrose chain and thus theoretically converts the starch quantitatively to dextrose. The action of glucoamylase on dextrin polymers is much more specific at the alpha-1,4-glucosidic bonds than the alpha-1,6-glucosidic bonds in that it will cleave the former type bond approximately 30 times as fast as the latter type bond. One unit of glucoamylase is capable of saccharifying soluble starch at a rate equivalent to one gram of dextrose per hour at 60° C. and pH 4.3 provided that not more than 25 percent of the substrate is saccharified during the assay.

The presence of transglucosidase with glucoamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly, it is highly desirable to separate the desired glucoamylase enzyme from other enzymes, principally transglucosidase, present in fungal enzyme preparations which, in the hydrolysis of starch, interfere with the formation of dextrose.

The present invention provides a process for purifying glucoamylase-containing fungal enzyme preparations to inactive and/or separate therefrom enzymes which, in the hydrolyzation of starchy materials, interfere with the production of dextrose. The present invention also provides a process for hydrolyzing starch to obtain high yields of dextrose by subjecting a liquefied starchy material to the action of a purified glucoamylase-containing fungal enzyme preparation from which there has been removed those enzymes which interfere with the production of dextrose.

In accordance with the present invention a glucoamylase-containing fungal enzyme preparation is purified by treating an aqueous dispersion thereof with colloidal alumina monohydrate having the boehmite crystal lattice. The treatment is carried out by intimately dispersing the solid colloidal alumina monohydrate in the aqueous enzyme preparation in a manner that the alumina monohydrate is distributed throughout the enzyme preparation. After treatment, the aqueous fungal enzyme preparation is filtered or centrifuged to remove solids with the desired glucoamylase enzyme remaining in the filtrate.

The colloidal alumina monohydrate which has been found particularly unique for the purification of glucoamylase-containing preparations in accordance with this invention is colloidal alumina monohydrate having the boehmite crystal lattice. Detailed descriptions of such material and methods for its preparation are provided in U.S. Patent 2,915,475, dated Dec. 1, 1959, and the disclosures therein are hereby incorporated herein. In general, the colloidal alumina monohydrate is a fibrous colloidal alumina monohydrate having the boehmite crystal lattice which can be produced in the form of a free-flowing fluffy powder of high specific surface area. The treating agent may be employed in solid form or as a gel.

Typical chemical and physical properties of the colloidal alumina monohydrate employed in accordance with the invention are:

| | | |
|---|---|---|
| AlOOH | percent | 83.1 |
| $CH_3COOH$ | do | 9.8 |
| $SO_4$ | do | 1.7 |
| Water | do | 5.0 |
| $NH_4$ | do | 0.2 |
| Na | do | 0.07 |
| Fe | do | 0.02 |
| $SiO_2$ | do | 0.02 |
| Specific surface area | $m.^2/g.$ | 274 |
| Pore volume | cc./g. | 0.53 |
| Pore diameter | Angstroms | 77 |
| Absolute density (fibril) | g./cc. | 2.28 |
| Refractive index (fibril) | $n_{25}^D$ | 1.580 |
| Color | | White |

The principal object of the process of the present invention is to effectively remove transglucosidase from the culture broth with minimum loss in glucoamylase activity. To this end the process is carried out at a temperature within the range from about 5° C. to about 50° C., preferably at a temperature from about 20° C. to 40° C. Higher temperatures such as, for example 60° C. or higher, can be used but at the higher temperatures inactivation of the desired glucoamylase occurs. The treatment is carried out for a period of time sufficient to effect good dispersion of the colloidal alumina monohoydrate throughout the enzyme preparation. Thus, the treatment may vary from several minutes up to several hours or more. The fungal enzyme preparation is maintained at a pH within the range from about 2 to 7 during the treatment. The colloidal alumina monohydrate is employed in amounts sufficient to effectively purify the fungal enzyme preparation. The specific amount to employ will depend upon the amount of transglucosidase activity present therein. In general, the colloidal alumina monohydrate is employed in an amount from about 2 to about 10%, preferably 5% by weight of the aqueous glucoamylase preparation.

The colloidal alumina monohydrate solid together with deleterious substances including the transglucosidase enzyme is removed after treatment by filtering or centrifuging. Removal of these substances leaves a purified glucoamylase solution which is generally lighter in color than the original solution and which hydrolyzes starch substrates to dextrose more completely than the original solution.

One specific preferred embodiment of the process of this invention is carried out as follows: A glucoamylase-containing fungal enzyme culture filtrate, either with mycelium present or after being filtered to remove mycelium, is adjusted to a pH of about 4. The temperature of the enzyme liquor is maintained at about 40° C. Colloidal alumina monohydrate having the boehmite crystal lattice is intimately dispersed in the enzyme culture liquor and the mixture agitated for a period of about 60 minutes. After the 60-minute agitation period, the solution is filtered. The filtrate containing the glucoamylase enzyme, substantially devoid of transglucosidase activity, can be used for starch conversion in this form or it can be concentrated or it can be precipitated by means of a precipitating agent such as alcohol to obtain the glucoamylase enzyme in dry form.

Several procedures can be employed to evaluate the effectiveness of the purification treatment. The ultimate test is, of course, the ability of the treated enzyme preparation to hydrolyze starch to produce hydrolyzates having high dextrose contents such as dextrose equivalents (D.E.) of 94 to 98 and above.

The advantages of the invention will be further illustrated by the following example.

*Example*

One gram of insoluble activated colloidal alumina monohydrate having the boehmite crystal structure and typical properties as indicated above, was stirred into each of six 20-milliliter aliquots of a solution of enzyme that had previously been precipitated by addition of methanol to a culture filtrate of *Aspergillus niger*. The colloidal alumina monohydrate was employed in an amount corresponding to 5% by weight of the enzyme preparation. The mixtures were stirred and adjusted to various pH values by slow addition of either 1 N sulfuric acid or 1 N sodium hydroxide. After agitation for an hour at 30° C. the mixtures were filtered. The filtrates were adjusted to pH 4.3 and assayed for glucoamylase potencies with the results shown below. No attempt was made to maintain the volume of enzyme solution constant, therefore, the relative enzyme activities do not indicate level of enzyme recovery in the process.

The enzyme solutions were then added to 100 grams dextrin solution maintained at a pH of 4.0 in 250-milliliter tared Erlenmeyer flasks. The enzyme solutions were added in amounts to provide one glucoamylase unit per 6 grams of starch. The dextrin solution had a starch content of 30% and had been liquefied by a bacterial enzyme to a reducing power of 20 dextrose equivalent (D.E.), i.e., equivalent to the reducing power of 20% dextrose calculated on the dry basis. The flasks were then agitated on a reciprocal shaker at 60° C. for 69 hours when the dextrose equivalent (D.E.) values of the various hydrolyzates were determined and tabulated as follows:

| Treatment pH | Glucoamylase units per ml in filtrate | 69 hour D.E. of starch hydrolyzates |
| --- | --- | --- |
| 2.5 | 8.59 | 98.0 |
| 3.0 | 8.52 | 97.1 |
| 3.5 | 7.56 | 97.2 |
| 4.0 | 7.23 | 97.3 |
| 5.0 | 8.45 | 95.5 |
| 6.0 | 8.45 | 95.2 |
| Untreated Control | 11.00 | 93.5 |

The above results vividly demonstrate the improved saccharification properties of glucoamylase-containing preparations which are purified in accordance with the present invention.

Those modifications and equivalents which fall within the spirit of the invention and the scope of the appended claims are to be considered part of the invention.

I claim:
1. A process of purifying a transglucosidase- and glucoamylase-containing fungal enzyme preparation which comprises treating said preparation in aqueous medium with colloidal alumina monohydrate having the boehmite crystal lattice and then separating solids from the glucoamylase preparation.

2. The process of claim 1 wherein treatment is carried out at a temperature between about 5° and 50° C.

3. The process of claim 1 wherein treatment is carried out at a pH of from about 2 to about 7.

4. The process of claim 1 wherein the transglucosidase and glucoamylase-containing fungal enzyme preparation is derived from the Aspergillus genus.

5. The process of claim 1 wherein the transglucosidase and glucoamylase-containing fungal enzyme preparation is derived from *Aspergillus niger*.

6. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium with colloidal alumina monohydrate having the boehmite crystal lattice and then separating solids from the glucoamylase preparation.

References Cited

UNITED STATES PATENTS 2,915,475  12/1959  Buosh _____ 252—313
3,042,584  7/1962   Kooi et al. _____ 195—31
3,101,302  8/1963   Inglett _____ 195—66

OTHER REFERENCES

Dirks, B. M., et al.: "Cereal Chemistry," vol. 26, pp. 98–109.

A. LOUIS MONACELL, *Primary Examiner.*

L. M. SHAPIRO, *Assistant Examiner.*